United States Patent [19]

Barley

[11] 4,384,744
[45] May 24, 1983

[54] SEAT RECLINING MECHANISM
[75] Inventor: Geoffrey W. Barley, Brookfield, Wis.
[73] Assignee: UOP Inc., Des Plaines, Ill.
[21] Appl. No.: 244,514
[22] Filed: Mar. 16, 1981
[51] Int. Cl.³ ............................................. A47C 1/026
[52] U.S. Cl. .................................... 297/367; 16/327; 16/354
[58] Field of Search ............................... 297/363–371, 297/354, 355; 16/297, 327, 333, 343, 354

[56] References Cited
U.S. PATENT DOCUMENTS

| | | | |
|---|---|---|---|
| 3,511,534 | 5/1970 | Turner | 297/366 X |
| 3,840,268 | 10/1974 | Johndrow et al. | 297/367 X |
| 4,076,309 | 2/1978 | Chekirda et al. | 297/363 |
| 4,103,970 | 8/1978 | Homier | 297/363 |
| 4,188,064 | 2/1980 | Cheshire | 297/367 |

FOREIGN PATENT DOCUMENTS

| | | |
|---|---|---|
| 1187870 | 4/1970 | United Kingdom . |
| 1218489 | 1/1971 | United Kingdom . |
| 1362877 | 8/1974 | United Kingdom . |
| 1403304 | 8/1975 | United Kingdom . |
| 1436134 | 5/1976 | United Kingdom ............... 297/367 |
| 1528188 | 10/1978 | United Kingdom . |
| 1541295 | 2/1979 | United Kingdom . |

Primary Examiner—William E. Lyddane
Attorney, Agent, or Firm—James R. Hoatson, Jr.; Barry L. Clark; William H. Page, II

[57] ABSTRACT

Recliner mechanism for a vehicle seat has a combination cam and bearing member operated by a manual control member positioned at the end of a rotatable support shaft for lifting one toothed locking segment carried by the seatback frame out of contact with another carried by the seat base, thus permitting the seatback to be tilted to any desired angle. Release of the control member in any position of adjustment permits the cooperating toothed locking segments to move together into locking engagement. A seatback return spring biases the seatback forwardly, while a torsion spring biases the control member and cam member toward their locked position. Where desired, a recliner mechanism can be provided for each side of the seatback with the two mechanisms being mounted at the opposite ends of the rotatable support shaft and operated by a single control member.

6 Claims, 5 Drawing Figures

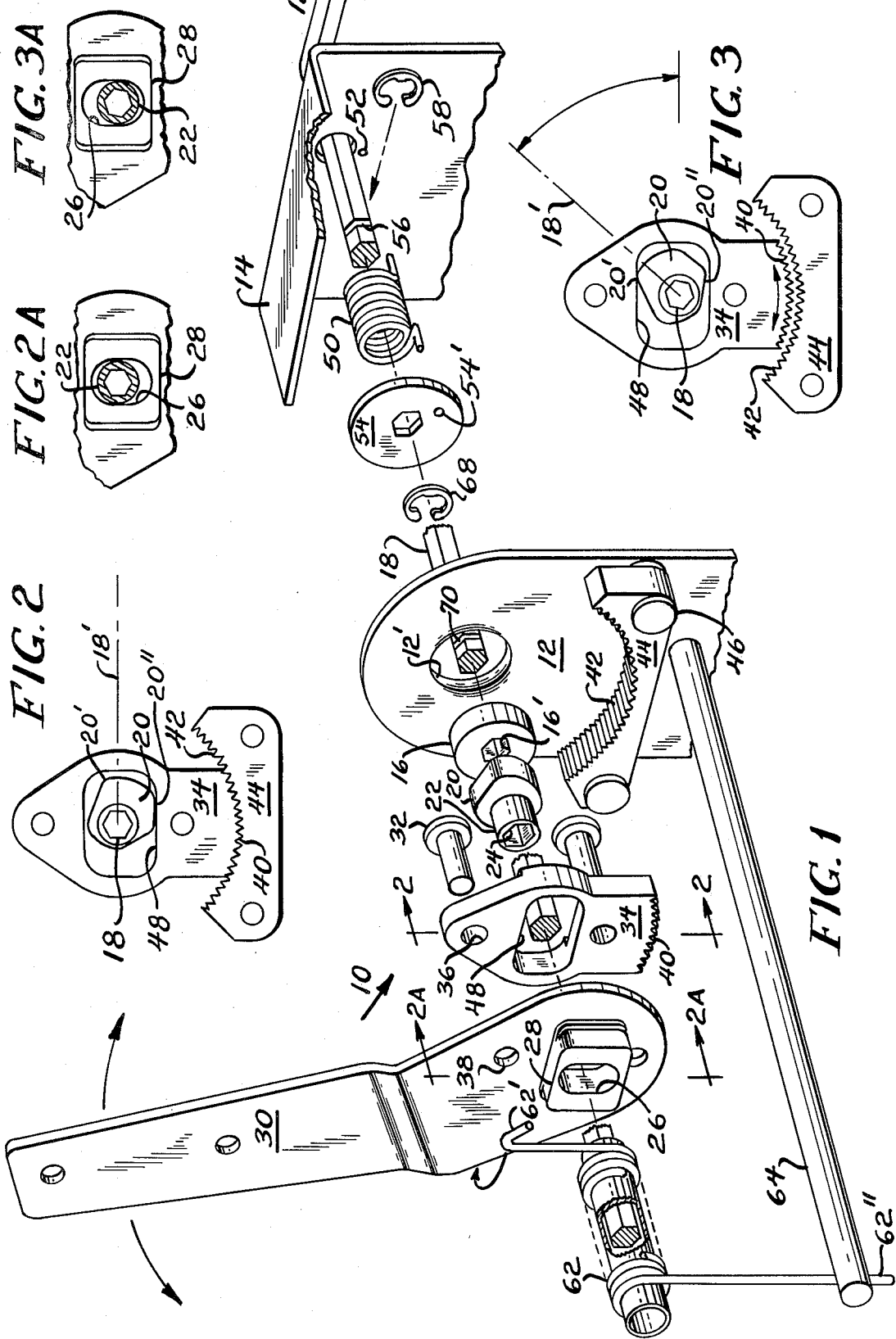

SEAT RECLINING MECHANISM

BACKGROUND OF THE INVENTION

The invention relates to reclining mechanisms of the type which permit a seat occupant to vary the seatback angle to any of a number of positions within an angular range. A substantial number of patents exist which disclose various types of recliner mechanisms in which a pair of toothed members are movable into and out of locking engagement by the operation of a lever which actuates a movable cam surface. Some of these include U.S. Pat. Nos. 4,076,309 and 4,103,970, and British Pat. Nos. 1,187,870, 1,218,489, 1,362,877, 1,403,304, 1,528,188 and 1,541,295.

SUMMARY OF THE INVENTION

It is among the objects of the present invention to provide a seat recliner mechanism that is effective for its purpose and at the same time quite simple in its construction and economical in cost. A further object is to provide a recliner mechanism which can be duplicated on each side of a seatback and operated by a single control shaft.

These and other objects are accomplished by the mechanism of the present invention which is supported by a pair of apertured bracket or housing members, which are integral with the seat frame. The mechanism, which is preferably duplicated at each side of the seat frame, includes a bearing and cam assembly which includes cylindrical bearing portions at its axially opposed ends and an intermediate peripheral cam portion which has a hollow interior which is preferably of a hexagonal configuration. The cam portion is mounted so as to be rotatable with a hexagonal shaft which extends across the back of the seat and is supported in an aperture in one of the brackets by the outboard bearing portion of the bearing and cam assembly. The inboard bearing portion passes through an elongated slot in one of the backrest support arms and supports the arm against movement in one direction while permitting a small degree of movement in a direction normal to said one direction. The cam portion and bearing portions which define the assembly may all be integrally joined as a powder metal casting, for example, or for ease of manufacture they may be formed as separate elements. An apertured member having a curved multi-tooth segment on a portion of its peripheral surface is positioned between the bracket or housing and the backrest support arm so as to surround the cam portion which is adapted to reside within its aperture. The apertured member is fixed to the backrest support arm and aligned therewith so that its aperture is generally aligned with an axis passing through the center of the elongated slot in the support arm. The aperture in the apertured member preferably comprises an elongated slot which is arranged generally normally to the elongated slot in the support arm. The normally arranged slots cooperate with each other and with the cam and bearing assembly to insure that the support arm will be positively supported at any angle of adjustment and regardless of whether the toothed segments are in or out of engagement. The hexagonal shaft may have a manual control knob at one end or may be bent at 90° to form a control lever. A first torsion spring mounted on the shaft urges the shaft to its locked position while a second spring urges the backrest to its normal upright position. Since the same shaft supports reclining mechanisms at each side of the seat, a single set of springs can be used rather than providing duplicate sets on each side of the seat.

BRIEF DESCRIPTION OF THE DRAWINGS

FIG. 1 is an exploded perspective view illustrating the various elements of the reclining mechanism;

FIG. 2 is an end view taken line 2—2 of FIG. 1 with the mechanism in its locked position;

FIG. 2A is an end view taken on line 2A—2A of FIG. 1;

FIG. 3 is an end view similar to FIG. 2, but showing the mechanism in its unlocked position; and FIG. 3A is an end view similar to FIG. 2A but showing the mechanism in its unlocked position.

DETAILED DESCRIPTION OF THE INVENTION

Referring to FIG. 1, the improved recliner mechanism is indicated generally at 10. The mechanism 10 is supported by a bracket or frame member 12 which is integral with one side of a seat frame (not shown). The bracket 12 can vary in shape depending upon the other construction features of the seat. For example, the angle member 14 may be welded to the top of bracket 12 and utilized to support an armrest (not shown) as well as enclose some of the mechanism 10. The bracket 12 has an axially flanged portion 12' which provides an elongated support surface for the outer surface of the outboard cylindrical bearing member 16. An axial opening 16' in the bearing 16 is shown as being hexagonally shaped so that it can rotate with the hexagonally shaped support shaft 18. Positioned axially adjacent to the bearing 16 is a combination cam 20 and inboard bearing 22 which include a hexagonal inner surface 24 which keys the cam to the shaft 18 so that it can rotate between its FIG. 2 locked position and its FIG. 3 unlocked position as the handle portion 18' of the shaft is rotated. Although the cam 20 and bearing 22 are shown as being unitary with each other and separate from bearing 16, all three parts could be formed as one piece or all could be formed separately, depending upon the manufacturing cost. The inner bearing 22 is received within a vertically elongated bearing slot 26 in a block 28 which is welded to the reclinable support arm 30 which is attached to one side of the backrest of the seat (not shown). Affixed to the opposite side of the arm 30 by rivets or other fasteners 32 is a movable segment member 34 which has fastener receiving holes 36 aligned with holes 38 in arm 30. The movable segment 34 has a curved set of integral rack teeth 40 on its lower end which can selectively engage different portions of the longer series of curved rack teeth 42 which are located on the fixed segment member 44 which is fastened to the bracket 12 by fasteners 46. A horizontally elongated aperture or bearing slot 48 is formed in the segment member 34 and is of sufficient size to receive the cam 20 which can be moved between its backrest locking position shown in FIG. 2 and its backrest unlocking position shown in FIG. 3

When no actuating force is applied to lift handle 18', the torsion spring 50 will urge it toward the locked position shown in FIGS. 1 and 2. As can be seen, the outer end of spring 50 would engage aperture 52 in the frame member 14 while the inner end would engage aperture 54' in the hexagonally apertured washer 54. The spring 50 and washer 54 are retained to the right of groove 56 by retaining ring 58. When the handle 18' is lifted to rotate the shaft 18, the washer 54 will also rotate and tension the spring 50. At the same time, the cam 20 will be rotated from its FIG. 2 to its FIG. 3 position so that its edge portion 20' will engage and lift the upper edge surface of slot 48 and its edge portion 20" will leave the lower edge surface. It will be noted that edge portion 20' is on a corner of the cam 20 where it will quickly lift the teeth 40 out of contact with the teeth 42 with a small degree of rotation of shaft 18, thus protecting the teeth. Also, the lower edge cam portion 20" is straight and elongated so that the considerable forces acting on the segments when they are locked together during vehicle operation will be distributed over as large an area as possible. Since vertical slot 26 is in block 28 on arm 30 which is fixed to the segment 34, it is obvious that the arm 30 will be lifted and thus free to be reclined forwardly or backwardly as the segment 34 is moved in the direction of the arrows in FIG. 3. Since the axis of shaft 18 and of bearing 22 carried by it remains fixed, it can be seen in FIGS. 2A and 3A that the block 28 will move up as the cam rotates to its FIG. 3 position. The vertical slot 26 in the arm 30 restricts fore and aft horizontal movement of the arm relative to the bearing 22 at the location of the bearing while the horizontal slot 48 cooperates with the cam 20 to position the bearing 22 at either the top or bottom of slot 26. The aforesaid arrangement thus provides a very rigid mounting for the arms 30 which prevents looseness and rattling of the seatback (not shown) carried thereby. Since the convex teeth 40 and concave teeth 42 each are formed on a curved radius having its center on the axis of shaft 18, they will maintain good contact in any position of recline of the seatback.

To cause the seatback to be normally biased forwardly, a torsion spring 62 is mounted around the shaft 18 with one end 62' engaged behind the arm 30 and its other end 62" positioned behind a cross bar 64 which joins the two sides of the seat frame. Although the mechanism 10 would usually be duplicated on each side of the seat to provide adequate support, it is only necessary to use a single set of springs 50, 62 when the springs are of adequate strength for their purpose.

Although arm 30 appears in FIG. 1 to be free to move axially relative to the shaft 18, this is not the case since a seatback (not shown) would be positioned between two arms and prevent the left and right segments 34 from moving relative to the left and right brackets 12. Movement of bearing 16 to the right in FIG. 1 is prevented by a retaining ring 68 which engages a groove 70.

I claim as my invention:

1. A reclining mechanism for a vehicle seat comprising a backrest pivot bracket member which is adapted to be fixed relative to the seat frame; a backrest support arm; a cam and bearing assembly mounted on a support shaft for rotation with said shaft, said assembly having axially spaced cylindrical bearing portions at its ends and an intermediate cam portion, one of said cylindrical bearing portions being positioned in an aperture in said bracket member and the other being positioned in an elongated slot in said backrest support arm; a first, curved, multi-tooth sector member fixedly carried by said bracket member; a second, curved, multi-tooth sector member fixedly carried by said backrest support arm and selectively engageable in various positions with said first sector member, said second sector member having an internally formed elongated slot which receives said cam portion, said internally formed slot being arranged generally normal to the slot in the backrest support arm and in axial alignment therewith, said internally formed slot having a first wall which is adapted to be engaged by rotation of said cam portion so that a first edge portion of said cam portion applies a force to said first sector member to lock the teeth of said first and second sector members in engagement with each other, said internally formed slot having a second wall which is opposite said first wall and adapted to be engaged by the rotation into it of a second edge portion of said cam portion to cause said first and second sector members to move out of engagement with each other; a backrest return spring engaged at one end relative to said backrest support arm and at its other end relative to said bracket member so as to urge said backrest support arm forwardly; and a manually actuated handle means mounted on said support shaft for rotating said shaft.

2. The reclining mechanism of claim 1 wherein said elongated slot in said backrest support arm is positioned in a generally vertical direction when the backrest support arm is in its normal unreclined position.

3. The reclining mechanism of claim 2 wherein said second multi-tooth sector member has its teeth facing downwardly and arranged on a convex curve which has the axis of the support shaft as the center of its radius.

4. The reclining mechanism of claim 1 wherein the cam portion has its peripheral edge shaped so that said first edge portion is straight and elongated so as to uniformly distribute the locking force between said cam portion and first sector member over a large area, said second edge portion being on a corner of said cam portion so that a small rotation of said cam portion will quickly lift the first and second sector members from engagement with each other.

5. The reclining mechanism of claim 1 wherein said return spring is a wound helical torsion spring which is positioned in surrounding relationship to the support shaft, but is free of contact with it.

6. The reclining mechanism of claim 1 wherein a shaft return spring is mounted so as to be tensioned when said handle means is manually moved from its normal position in which said sector members are in locking engagement with each other to its operative position in which said sector members are disengaged.

* * * * *